(12) United States Patent
Sartor

(10) Patent No.: US 6,175,407 B1
(45) Date of Patent: Jan. 16, 2001

(54) APPARATUS AND METHOD FOR OPTICALLY IMAGING FEATURES ON THE SURFACE OF A HAND

(75) Inventor: Thomas F. Sartor, Sunnyvale, CA (US)

(73) Assignee: Identix Incorporated, Sunnyvale, CA (US)

(*) Notice: Under 35 U.S.C. 154(b), the term of this patent shall be extended for 0 days.

(21) Appl. No.: 09/215,682

(22) Filed: Dec. 17, 1998

(51) Int. Cl.⁷ .................. G06K 9/74; G01J 1/04
(52) U.S. Cl. .............. 356/71; 382/124; 382/127; 250/227.11
(58) Field of Search ............... 356/71; 382/127, 382/124; 250/227.11

(56) References Cited

U.S. PATENT DOCUMENTS

| 4,032,889 | * | 6/1977 | Nassimbene | 250/227.11 |
| 4,322,163 | | 3/1982 | Schiller | 356/71 |
| 4,685,145 | | 8/1987 | Schiller | 382/52 |
| 4,784,484 | | 11/1988 | Jensen | 356/71 |
| 5,177,802 | | 1/1993 | Fujimoto et al. | 382/4 |
| 5,195,145 | * | 3/1993 | Backus et al. | 356/71 |
| 5,416,573 | | 5/1995 | Sartor | 356/71 |
| 5,526,436 | * | 6/1996 | Sekiya | 356/71 |
| 5,528,355 | | 6/1996 | Maase et al. | 356/71 |

* cited by examiner

Primary Examiner—Frank G. Font
Assistant Examiner—Zandra Smith
(74) Attorney, Agent, or Firm—Fish & Richardson P.C.

(57) ABSTRACT

Apparatus and methods for optically imaging features on the surface of a hand are described. An apparatus in accordance with one implementation includes a fixed light source for illuminating an imaging area, a movable convex contact surface, and a detector. The convex contact surface is exposed to contact a hand and to guide portions of the hand through the imaging area while maintaining contact with the hand. The detector is positioned to intercept light from the imaging area and is adapted to generate therefrom a signal representative of surface features of a hand contacting the contact surface in the imaging area. In accordance with another implementation, a method includes the following steps: placing the hand in contact with a contact surface; guiding the hand in fixed contact with the convex contact surface through an imaging area; illuminating the imaging area with light; intercepting light from the imaging area; and generating from the intercepted light, a signal representative of surface features of the contacting hand being guided through the imaging area.

26 Claims, 4 Drawing Sheets

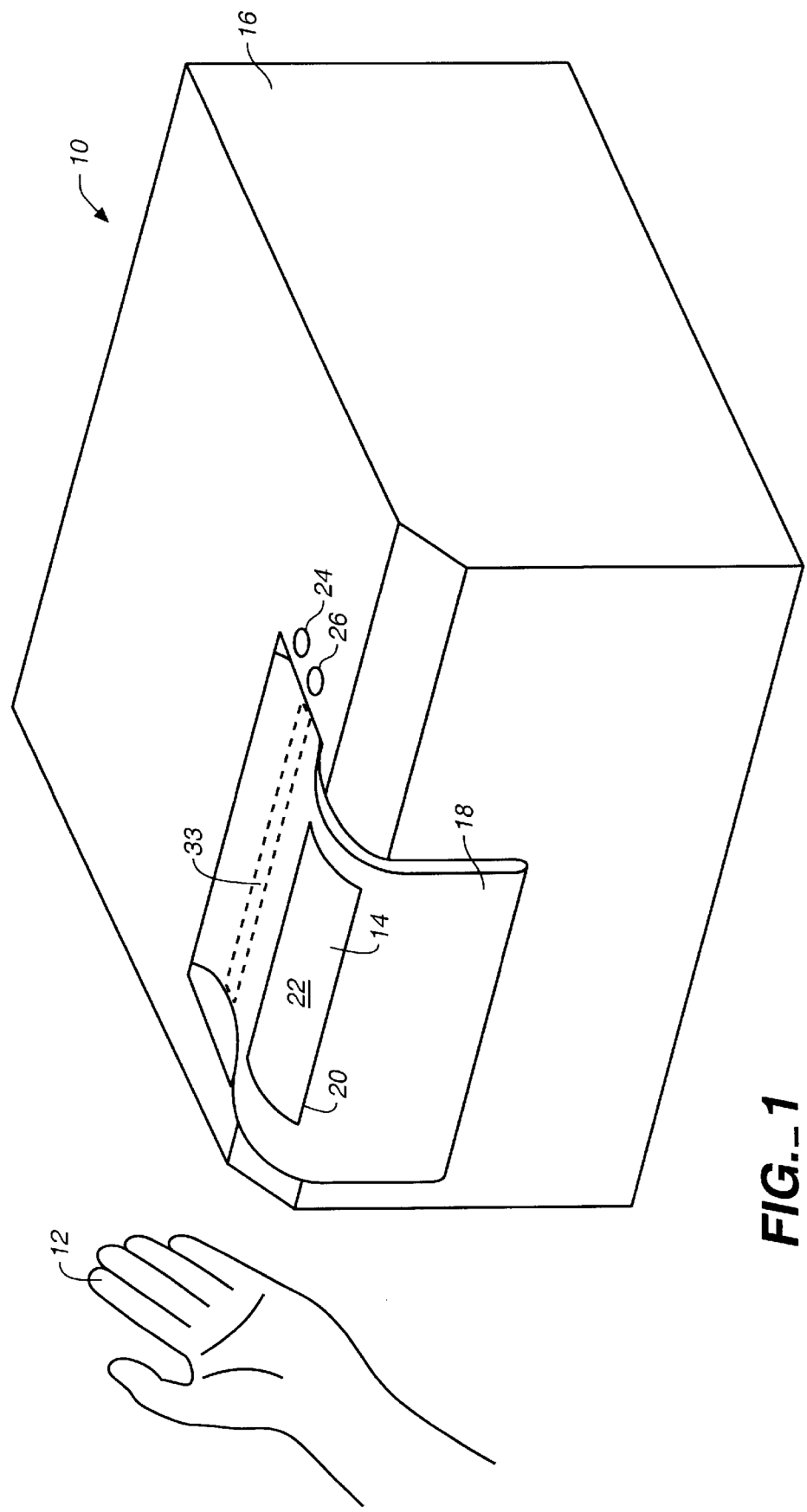
FIG._1

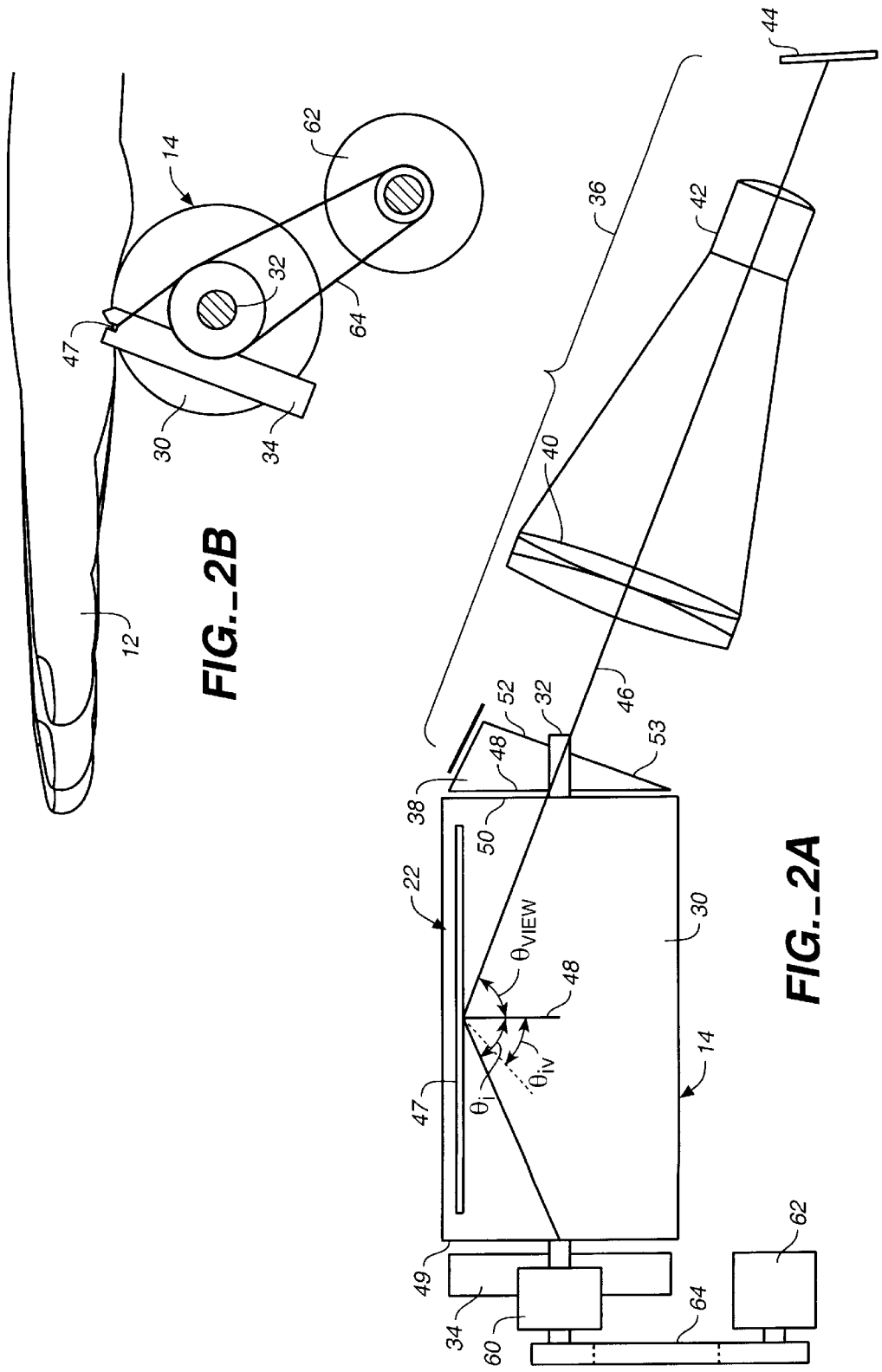

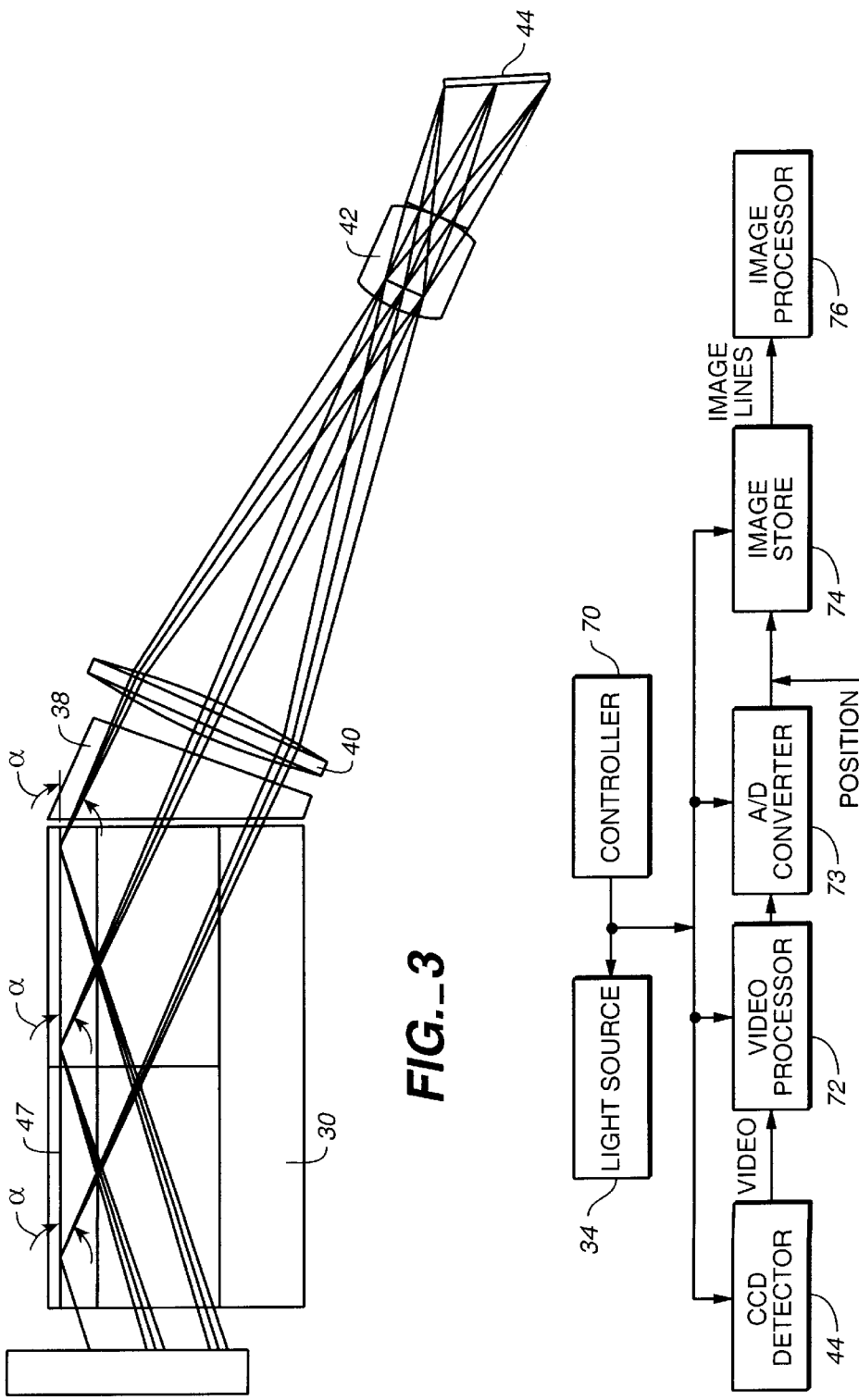
FIG._3
FIG._4

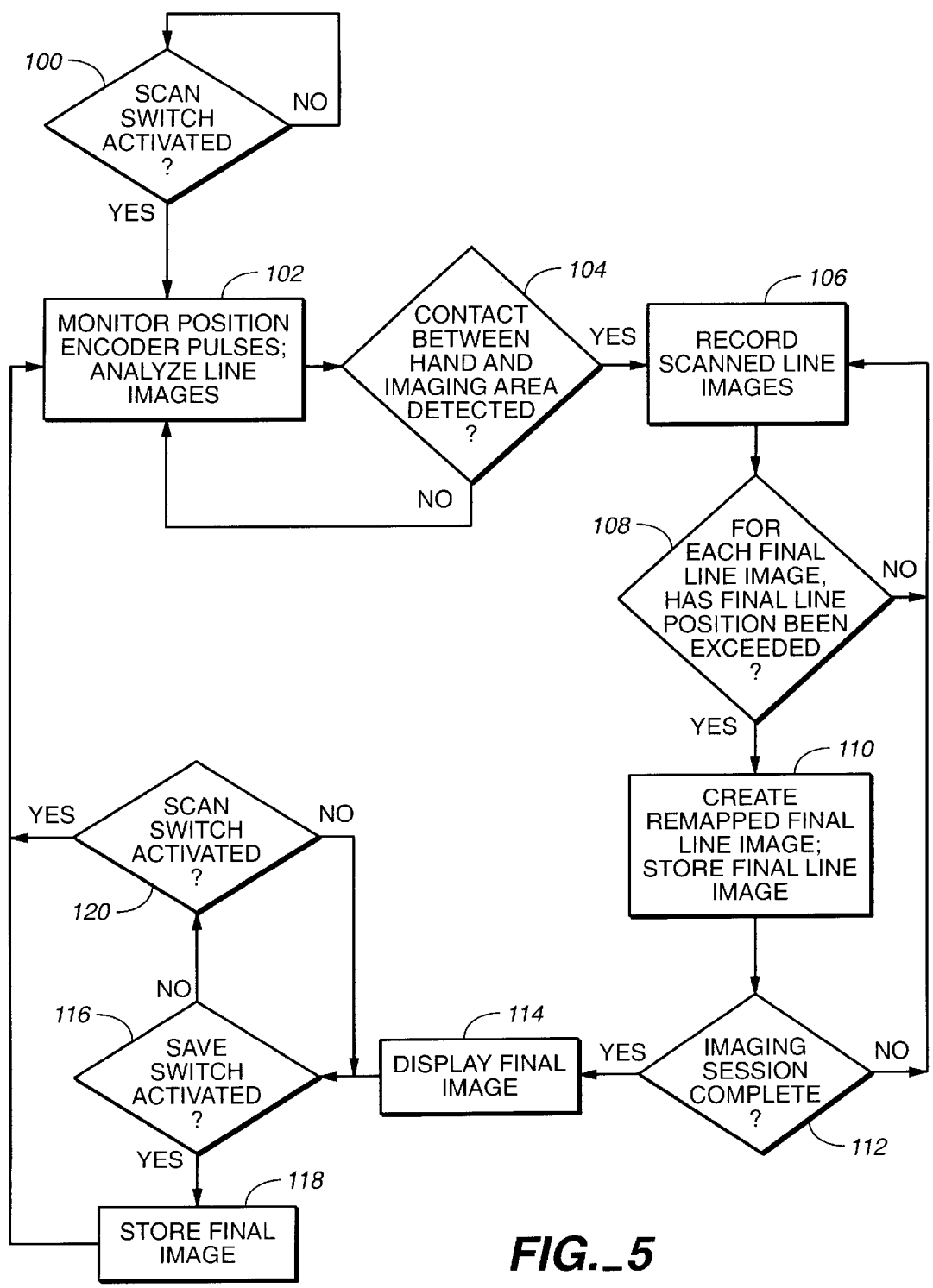
FIG._5

APPARATUS AND METHOD FOR OPTICALLY IMAGING FEATURES ON THE SURFACE OF A HAND

CROSS REFERENCE TO RELATED APPLICATIONS

This application is related to Sartor, U.S. Pat. No. 5,416,573, and Maase, U.S. Pat. No. 5,528,355, each of which is herein incorporated by reference.

BACKGROUND OF THE INVENTION

The invention relates to apparatus and methods for optically imaging features on a surface of a hand, such as fingerprints and palmprints.

Fingerprints and palmprints are commonly taken by applying ink to the surface of the skin and then transferring the ink to a paper medium for recording. The application of ink to the skin and the subsequent transfer to paper requires a skilled expert to produce high quality images. Optical systems for scanning fingerprint and palmprint images have been developed to avoid problems associated with ink-based methods. In common optical systems, a hand to be scanned is held against a transparent platen, and an optical detector scans light reflecting from the interface between the hand and the platen to generate signals representative of fingerprint or palmprint images. These signals are digitized, stored in digital computer memory, and processed for transmission or printing.

SUMMARY OF THE INVENTION

In one aspect, the invention features an apparatus for optically imaging features of a hand, comprising: a light source for illuminating an imaging area; a convex contact surface exposed to contact a hand and to guide portions of a hand in fixed contact with the convex contact surface through the imaging area; and a detector positioned to intercept light from the imaging area and to generate therefrom a signal representative of surface features of a hand contacting the contact surface in the imaging area.

In another aspect, the invention features a method for optically imaging features on a surface of a hand, comprising: placing the hand in contact with a convex contact surface; guiding the hand in fixed contact with the contact surface through an imaging area; illuminating the imaging area with light; intercepting light from the imaging area; and generating from the intercepted light, a signal representative of surface features of the hand being guided through the imaging area.

Embodiments may include one or more of the following features.

The contact surface may reflect light produced by the light source. The contact surface may be convex in shape in the imaging area. The contact surface may have a constant radius of curvature in the imaging area. The contact surface may correspond to the surface of a rotatable cylinder. The contact surface may be configured to smooth portions of a contacting hand moving through the imaging area. The contact surface may contact different portions of a hand as the hand is being guided through the imaging area.

A damper may be coupled to the contact surface for adjusting the rate at which the contact surface guides portions of the hand through the imaging area. A monitor (e.g., a position encoder) may be provided for tracking the position of the contact surface relative to the imaging area. The contact surface may be adapted to guide portions of the hand through the imaging area in a scanning direction. The imaging area may be contained substantially in an image plane that intersects the contact surface along an image line that is substantially orthogonal to the scanning direction.

The detector may be configured to receive primarily light reflecting from the contact surface at an observation angle relative to a normal to the contact surface in the imaging area that is greater than the critical angle for an interface between the contact surface and air. The detector may be configured to receive primarily light reflecting from the contact surface at an observation angle relative to a normal to the contact surface in the imaging area that is greater than the critical angle for an interface between the contact surface and water. The observation angle may be less than the critical angle for an interface between the contact surface and the hand being imaged.

The light illuminating the contact surface in the imaging area may be substantially normal to the contact surface in the imaging area. The light source and the detector may be stationary. A controller may be provided for determining when an imaging session has begun. The controller may be configured to determine when an imaging session has ended.

Portions of a hand may be guided through the imaging area by rotating the convex guiding surface through the imaging area. An imaging area that is illuminated may be elongated in a direction that is substantially orthogonal to the direction in which portions of the hand are guided. A two-dimensional image of surface features of the contacting hand guided through the imaging area may be generated. The writer's palm of the hand may be placed against the convex contact surface to obtain a print of the writer's palm.

The invention can be used to obtain a complete print of a hand, including the palm and the sides of the hand. The invention can be implemented by an apparatus having a compact footprint. Also, because the contact surface guides the hand through the imaging area, as opposed to optically scanning a stationary hand, the invention can print a hand of any length—that is, the length of the print is not limited by the footprint of the imaging apparatus. Furthermore, because the contact surface is convex in shape, the invention can properly image surface features corresponding to the interior of the palm. The invention can also image the four fingers of a hand, either separately or as part of an image of the whole hand.

Other features and advantages will become apparent from the following description, including the drawings and the claims.

BRIEF DESCRIPTION OF THE DRAWINGS

FIG. 1 is a diagrammatic perspective view of an apparatus for optically imaging features on the surface of a hand.

FIG. 2A is a diagrammatic front view of certain components of the imaging apparatus of FIG. 1.

FIG. 2B is a diagrammatic side view of a hand being guided through an imaging area on a contact surface of the imaging apparatus of FIG. 1.

FIG. 3 is a diagrammatic side view of light paths through optical components of the imaging apparatus of FIG. 1.

FIG. 4 is a block diagram of a system for obtaining an image of surface features of a hand from one or more signals generated by the apparatus of FIG. 1.

FIG. 5 is a flow diagram of a method of optically imaging surface features on the surface of a hand.

DESCRIPTION OF THE PREFERRED EMBODIMENTS

Referring to FIG. 1, an apparatus 10 for optically imaging features on a surface of a hand 12 includes a contact surface 14 supported within a housing 16. Contact surface 14 is supported behind a removable cover 18 which has a slot 20 that bounds an imaging area 22. Cover 18 forms a substantially fluid-tight seal with contact surface 14 to prevent moisture, hand contaminants, and cleaning fluid from leaking into housing 16. Contact surface 14 is constructed to support hand 12 and guide it through imaging area 22.

In operation, hand 12 is placed on contact surface 14. A controller may automatically determine when hand 12 is placed on contact surface 14 and, thus, when to begin an imaging session. Alternatively, a SCAN switch 24 may be activated to initiate an imaging session. Contact surface 14 moves with respect to imaging area 22 and thereby guides portions of hand 12 contacting the contact surface through the imaging area. After hand 12 has been guided through imaging area 22, an image of the surface features of hand 12 may be displayed on a video monitor. The controller may automatically determine that the imaging session has ended, or a SAVE switch 26 may be activated to store or transmit the data corresponding to displayed image. The image data may be stored in non-volatile memory or transmitted to a central computer system. Imaging apparatus 10 may be used to obtain and verify an individual's fingerprints, palmprints, or heelprints. Imaging apparatus 10 may also be used to control an individual's access to facilities or computers.

As shown in FIGS. 2A and 2B, contact surface 14 corresponds to the surface of a rotatable cylinder 30 mounted on a central shaft 32 which is supported on bearings. Cylinder 30 is transparent to light produced by a light source 34. In one embodiment, cylinder 30 is formed from clear acrylic with a surface that has been polished to optical clarity. As explained below, image quality is improved when the hand portions to be imaged make complete and direct contact with the contact surface. Contact surface 14, therefore, is sized so that most hand sizes can conform to the convex shape of the contact surface. In a preferred embodiment, cylinder 30 is about three inches in diameter and about six inches long. A strip heater 33 (shown by dashed lines in FIG. 1) is located behind cylinder 30 to reduce condensation on contact surface 14 and to enhance the quality of contact between hand 12 and contact surface 14.

A thin coating of a transparent polymer (e.g., silicone, polyurethane, and epoxy) may be used to enhance the quality of hand contact with contact surface 14. Contact surface 14 may be coated with a polymer having a Shore A durometer of about 60–80. The polymer can be applied to contact surface 14 by drip or spray methods. Alternatively, a sheet polymer may by adhered to contact surface 14. In general, the polymer should be substantially resistant to corrosion by finger oils and cleaners.

Light source 34 is positioned adjacent to central shaft 32. Light source 34 illuminates imaging area 22 with light. Light source 34 preferably includes of a red light emitting diode (LED) light bar faced by a thin sheet diffuser. Light from imaging area 22 is detected by a detection system 36, which includes a prism 38, telecentric imaging lenses 40, 42 and an optical detector 44 (e.g., a CCD array). Detection system 36 is arranged along an optical axis 46. Detection system 36 is designed to receive light that lies along an image line 47 in imaging area 22.

Prism 38 is mounted 25° off the central axis defined by shaft 32 to accommodate the space needed by shaft 32 and its associated mounts. Prism 38 has a first surface 48 that is parallel to circular end surface 50 of cylinder 30 and further has a second surface 52 that is perpendicular to optical axis 46; the angle of intersection 53 between surface 50 and surface 52 is preferably 23.3°. Prism surface 48 is placed close to cylinder surface 50 to reduce deflection of the optical axis. Prism surface 48 may be spaced from cylinder surface 50 by a distance of about 2 mm or less. Prism 38 is preferably formed from the same material as cylinder 30 (e.g., acrylic).

Imaging lenses 40, 42 have a telecentric configuration so that the chief light ray received from image line 47 intersects contact surface 14 at the same angle ($\alpha$), as shown in FIG. 3. Lens 40 is large enough to image the entire imaging area 22. The magnification through lenses 40, 42 is selected to focus the entire imaging area 22 onto the detection surface of detector 44. In accordance with the Schiempflug condition, the detection surface of optical detector 44 is tilted with respect to optical axis 46 to bring the entire image line 47 into proper focus at the detection surface.

Optical detector 44 includes a CCD linear array of 5000 elements (pixels) which are spaced apart by about 7 microns ($\mu$m). In most hand scanning applications, the imaging area of interest will have a width of about 5 inches. Thus, an image resolution of about 600 dpi (dots per inch) can be achieved by sampling only 3000 of the 5000 pixels of detector 44. The CCD linear array preferably has a sampling rate of up to 10 Mpixels per second.

Light that is incident on the contact surface at an angle ($\theta_i$)—measured with respect to a normal 48 to the contact surface—that is greater than the critical angle ($\theta_{cr}$) will be internally reflected toward detection system 36. The critical angle is defined as the smallest angle of incidence for which light striking the contact surface is totally internally reflected within cylinder 30. The value of the critical angle at an interface between two materials is given by Snell's law, as explained in U.S. Pat. No. 5,416,573, which is herein incorporated by reference. The aperture of detection system 36 determines which of the internally reflected light rays reach detector 44. In particular, the angle ($\theta_{view}$) between optical axis 46 and normal 48 (referred to herein as the "viewing angle") determines which of the reflected light rays reach detector 44. Detection system 36 is oriented so that the angle ($\theta_{view}$) is greater than the critical angle for the interface between contact surface 14 and air. For example, if cylinder 30 is formed from acrylic, angle ($\theta_{view}$) would be selected to be greater than about 42°. Detection system 36 is oriented so that angle ($\theta_{view}$) is greater than the critical angle for the interface between contact surface 14 and water, but less than the critical angle for the interface between contact surface 14 and hand 12 (e.g., less than about 75° for an acrylic/hand interface, assuming an effective hand index of refraction of about 1.44). As a result of selecting a viewing angle that is greater than the critical angle for a contact surface/water interface, the image quality produced by imaging apparatus 10 is substantially unaffected by moisture or sweat on hand 12. An increased viewing angle also allows cylinder 30 to have a smaller diameter than if the system had a viewing angle of only 45°.

As mentioned above, surface features of hand 12 are imaged by guiding hand 12 over cylinder 30 through imaging area 22. Surface features on hand 12 are imaged as a result of the fact that the detected light intensity is diminished for locations along line 47 where surface features are in direct contact with contact surface 14—that is, light is frustrated where the hand directly contacts surface 14 so that a dark image of the contact areas is detected. Detection system 36 thus images a linear region across the width of hand 12. Optical detector 44 records the imaged linear region at a rate that is high enough to capture the entire hand as it moves through imaging area 22. A digital position encoder 60 tracks the position of contact surface 14 relative to imaging area 22, e.g., by sensing the rotation of a code wheel mounted on shaft 32 with an optical incremental rotary encoder (available from, e.g., Hewlett-Packard Company of Palo Alto, Calif.). Signals from encoder 60 are received by a controller. The position of contact surface 14 is recorded for each line image that is detected. As explained below, the final image of hand 12 is derived from the recorded line images and is composed of regularly spaced-apart line images of hand 12.

A damping motor 62 is coupled to shaft 32 by a belt 64 to adjust the rate at which the contact surface guides portions of a contacting hand through imaging area 22. Damping motor 62 adds to shaft 32 drag which is proportional to the rate at which cylinder 30 is rotated. This feature is implemented by imposing a resistive load on damping motor 62. When the rotation rate approaches a predefined limit, the resistive load on motor 62 is clamped to a fixed voltage, resulting in a significant increase in the drag applied to shaft 32. The maximum rate at which a hand may freely move through imaging area 22 may be about 5 inches per second. Assuming that detector 44 can output pixel data at a rate of 10 Mpixels per second, about 3000 image lines may be scanned by detector 44 per second. By limiting hand movement through imaging area 22 to 5 inches per second or less, an image resolution of at least 500 dpi can be achieved. Damper 62, therefore, reduces the likelihood that hand 12 will be moved too quickly through imaging area 22. The controller monitors the rate at which cylinder 30 rotates and triggers an alarm when a hand to be scanned has moved through the imaging area too quickly. Between imaging sessions, damping motor 62 is powered to slowly rotate cylinder 30 so that heater 33 evenly heats cylinder 30 to a temperature near body temperature (e.g., about 98° F.; about 35° C.).

As shown in FIG. 4, an imaging session is choreographed by a controller 70, which transmits timing and control signals to light source 34, detector 44, a video processor 72 and an image store 74. Detector 44 produces analog signals representative of line images of surface features of a hand in contact with contact surface 14 in imaging area 22. Video processor 72 includes a correlated double sampling circuit (CDS) to remove reset pulses for each pixel of detector 44. The intensity level measured by the dummy pixels of detector 44 is clamped to provide a baseline for the output signal. The detector output signal is then buffered to the level and source impedance required for digital conversion by a flash analog-to-digital (A/D) converter 73 (a 10-bit converter preferably is used to achieve a good signal to noise ratio). Image store 74 stores the digital signals received from video processor 72. An image processor 76 reads and processes the image lines stored in image store 74. As explained below, image processor 76 corrects illumination levels in the scanned image, geometrically re-maps the scanned image to eliminate distortion. The final image has a uniform background level and regular spacing of lines across the image. Image processor also detects when hand 12 contacts cylinder 30 in image area 22 and determines when hand 12 has moved completely out of imaging area 22. The final image is created as image line signals are generated by detector 44. In this way, only the final image must be stored in memory, resulting in a significant reduction in memory storage requirements.

Image processor 76 compensates for non-uniform illumination levels in the scanned line images by recording the signals produced when hand 12 is not in contact with contact surface 14. Image processor 76 uses this data to re-scale each pixel value in the scanned image lines to conform to a uniform background intensity. For example, for each pixel (i) in the scan line, a final pixel value ($V(i)_{final}$) can be obtained by scaling the intensity of each pixel ($V(i)_{pixel}$) by a factor given by the ratio of a desired background intensity ($V_{background}$) and the intensity measured when hand 12 was not in contact with surface 14 ($V(i)_{reference}$). That is, $$V(i)_{final}=(V(i)_{pixel} \times V_{background})/V(i)_{reference}$$

With care in construction, the image lines are all subject to the same non-uniform conditions (e.g., variation in illumination, transmission, and sensitivity across imaging area 22), in which case only one line of reference data is needed.

Processor 76 also uses the $V(i)_{reference}$ data as threshold values for determining when a hand has contacted cylinder 30 in imaging area 22. Processor 76 screens out false results by ignoring short term contact and contact over a relatively small area of imaging area 22. In the embodiment in which damping motor 62 continuously rotates cylinder 30 to maintain a uniform cylinder temperature, processor 76 may also determine when a hand has contacted imaging area 22 by sensing when cylinder 30 has stopped rotating.

It is often desirable to provide a final image composed of image lines that are spaced-apart by a fixed distance. Image processor 76 produces regularly spaced-apart final line images by associating with each scanned line the position tracked by position encoder 60. Final output image lines are interpolated from adjacent scanned image lines. Scanned image lines that are outside of a prescribed distance from a desired final line position (e.g., about 0.01 inch for a desired resolution of 500 lines per inch) are discarded. Since scanned lines are spaced very closely when the hand is moved slowly, lines that are spaced closer than about 0.001 inch from the preceding line are also discarded. The slower a hand is moved through imaging area 22, the greater the number of discarded image lines. Preferably, the interpolation is performed on the fly (e.g., output lines are produced as the desired image lines position is passed), thereby avoiding the need to store unnecessary image lines.

Image processor 76 calibrates each image line so that each pixel is properly positioned on a scan line, thereby compensating for non-linear distortions associated with the tilted detection system 36. To this end, processor 76 measures the pixel locations of a grid of evenly spaced-apart lines (e.g., 2 mm) superimposed on image area 22. The pixel locations corresponding to the grid coordinate locations are interpolated to the desired sample resolution for the line (typically 500 dpi). See, for example, William K. Pratt, *Digital Image Processing*, second edition (1991), which is herein incorporated by reference. Since many of the scanned image pixels fall between grid locations, the locations of most the scanned image pixels are determined by spline interpolation.

Referring to FIG. 5, in a method of optically imaging features on the surface of a hand, controller 70 choreographs the optical printing of a hand as follows. Controller 70 determines whether SCAN switch 24 (FIG. 1) has been activated (step 100). After the SCAN switch has been activated, controller 70 monitors pulses from encoder 60 to determine the rotational position of cylinder 30, and analyzes line images captured by detector 44 (step 102). Controller 70 determines whether hand 12 has contacted imaging area 22 (step 104), either by comparing the scanned line images against a measured background intensity, or by detecting when cylinder 30 is not rotating. If controller 70 does not detect any contact between hand 12 and imaging area 22, controller 70 continues to monitor the encoder pulses and analyze scanned line images (step 102). If controller 70 detects hand contact, controller 70 begins to store scanned line images in image store 74 (step 106). For each final line position, controller 70 determines whether the current scanned line position has exceeded the final line position (step 108). If the final line position has been exceeded, image processor 76 creates a remapped final line image, which is stored in memory (step 110); otherwise, image store 74 continues to store scanned line images (step 106). Controller 70 determines whether the imaging session is complete (step 112), either by comparing the scanned line images against a measured background intensity, or by detecting when cylinder 30 has begun to rotate at the rate set by damping motor 62. If the imaging session is not complete, image store 74 continues to store scanned line images (step 106); otherwise, the final complete image is displayed (step 114). If SAVE switch 26 has been activated (step 116), the final image is stored or transmitted (step 118). If the SAVE switch 26 has not been activated (step 116) and the SCAN switch 24 is activated (step 120), the imaging session is repeated (step 106).

Imaging apparatus 10 can capture an image of the full hand or only parts of the hand. To capture an image of surface features of the entire hand, a user may simply press the palm of the hand against contact surface 14 and slowly roll the entire hand over cylinder 30 through imaging area 22. If only the palm image is desired, the lower part of the hand should be captured; the detected contact width of the lines can be used to reflect the lower edge of the palm since that area is typically wider than the wrist area. For traditional fingerprint cards, the four finger slap image is needed to confirm conventional ink-based rolled images. Imaging apparatus 10 can be used for this application by ensuring that the fingers are kept in contact when the hands are moved over the drum. The images of the fingers can be detected from their convex outlines and the voids separating them. Once the tip locations and general finger directions are determined, image processor 76 can rotate the images to conform to the corresponding finger positions of traditional fingerprint cards. Imaging apparatus 10 may also be used to capture images of the edges of a hand, also referred to as the "writer's palm."

Other embodiments are within the scope of the claims.

For example, cylinder 30 may be formed from a tube filled with a transparent liquid or cast material having a sufficient optical index of refraction (e.g., about 1.48). Cylinder 30 may be supported on rollers rather than shaft 32; without shaft 32, the optical axis need not be rotated to avoid the central axis of cylinder 30 as in the embodiment described above. Position encoder 60 can be constructed to record the movement of the surface of cylinder 30 instead of rotating with the shaft. Damping motor 62 may be replaced by a mechanical damper. In an alternative embodiment, an audible alarm is triggered when cylinder 30 is moved too quickly.

In one embodiment, position encoder 60 triggers the collection of a new image line in response to a fixed incremental movement of cylinder 30. In this embodiment, light source 24 is configured to illuminate image 22 with light pulses or a shutter is used to produce uniform image pulses at detector 44; this reduces variations in the charge integration time for each line image. In this implementation the line images are not re-mapped by image processor 76.

In the above-described embodiments, images of surface features of a hand were obtained as a result of frustration of total internal reflection at the locations where the ridges and other surface features contact the contact surface. Light that is incident upon these areas of contact refracts through the platen/finger interface and is partially absorbed and partially dispersed upon contact with the hand. Only a small fraction of this incident light is reflected back to the detector at an angle of reflection that is substantially equal to the angle of incidence and, therefore, the ridges and other contacting hand features contribute a dark component to the final hand image. In another embodiment, an image that is of the opposite polarity is created—i.e., where the ridges and other contacting hand features contribute to the bright features of the final hand image. In this embodiment, the light source is configured to illuminate the imaging area at an angle of incidence of about 0°. Since this angle of incidence is less that the critical angle for a platen/air interface, a substantial amount of the incident light is refracted through the platen/air interface and is reflected diffusely off the hand. In this embodiment the reflected light is observed at an angle that is greater than the critical angle for the platen/air interface so that ver little of the reflected light is detected. Instead, the detected light corresponds primarily to the light dispersed from the hand. In the images produced by this embodiment, the ridges and other contacting hand features are relatively brighter than the valleys and other non-contacting regions of the hand.

What is claimed is:

1. An apparatus for optically imaging features of a hand, comprising:
    a light source to illuminate an imaging area;
    a convex contact surface exposed to contact a hand and to guide portions of a hand in fixed contact with the contact surface through the imaging area;
    a detector positioned to intercept light from the imaging area and to generate therefrom a signal representative of surface features of a hand contacting the contact surface in the imaging area; and
    a damper coupled to the contact surface to adjust the rate at which the contact surface guides portions of a hand through the imaging area.

2. The apparatus of claim 1 wherein the contact surface reflects light produced by the light source.

3. The apparatus of claim 1 wherein the contact surface is convex in shape in the imaging area.

4. The apparatus of claim 1 wherein the contact surface has a constant radius of curvature in the imaging area.

5. The apparatus of claim 1 wherein the contact surface corresponds to the surface of a rotatable cylinder.

6. The apparatus of claim 1 wherein the contact surface is configured to smooth portions of a contacting hand moving through the imaging area.

7. The apparatus of claim 1 wherein the contact surface contacts different portions of a hand as the hand is being guided through the imaging area.

8. The apparatus of claim 1 further comprising a monitor for tracking the position of the contact surface relative to the imaging area.

9. The apparatus of claim 8 wherein the monitor comprises a position encoder.

10. The apparatus of claim 1 wherein the contact surface is configured to guide portions of the hand through the imaging area in a scanning direction, and the imaging area is contained substantially in an image plane that intersects the contact surface along an image line that is substantially orthogonal to the scanning direction.

11. The apparatus of claim 1 wherein the detector is configured to receive primarily light reflecting from the contact surface at an observation angle relative to a normal to the contact surface in the imaging area that is greater than the critical angle for an interface between the contact surface and air.

12. The apparatus of claim 1 wherein the detector is configured to receive primarily light reflecting from the contact surface at an observation angle relative to a normal to the contact surface in the imaging area that is greater than the critical angle for an interface between the contact surface and water.

13. The apparatus of claim 12 wherein the observation angle is less than the critical angle for an interface between the contact surface and the hand being imaged.

14. The apparatus of claim 1 wherein the light illuminating the contact surface in the imaging area is substantially normal to the contact surface in the imaging area.

15. The apparatus of claim 1 wherein the light source and the detector are stationary.

16. The apparatus of claim 1 further comprising a controller for determining when an imaging session has begun.

17. The apparatus of claim 16 wherein the controller is configured to determine when an imaging session has ended.

18. The apparatus of claim 1 wherein the rate at which the hand is guided through the imaging area is about five inches per second or less.

19. An apparatus for optically imaging features on a surface of a hand, comprising:

means for illuminating an imaging area;

means for contacting a hand with a convex contact surface and guiding portions of the hand in fixed contact with the contact surface through the imaging area;

means for intercepting light from the imaging area and generating therefrom a signal representative of surface features of the hand contacting the contact surface in the imaging area; and means for dampening coupled to the contact surface for adjusting the rate at which portions of the hand are guided through the imaging area.

20. An apparatus for optically imaging features on a surface of a hand, comprising:

a light source to illuminate an imaging area;

a rotatable transparent cylinder having a cylindrical contact surface to contact the hand and configured to guide portions of the hand contacting the contact surface through the imaging area; and a detector positioned to intercept light from the imaging area and to generate therefrom a signal representative of surface features of the hand contacting the contact surface in the imaging area, the detector being configured to receive primarily light reflecting from the contact surface at an observation angle relative to a normal to the contact surface in the imaging area that is greater than a critical angle for an interface between the contact surface and water.

21. A method for optically imaging features on the surface of a hand, comprising:

placing the hand in contact with a convex contact surface;

guiding the hand in fixed contact with the convex contact surface through an imaging area;

dampening movement of the contact surface to adjust the rate at which the hand moves through the imaging area;

illuminating the imaging area with light;

intercepting light from the imaging area; and generating from the intercepted light a signal representative of surface features of the contacting hand being guided through the imaging area.

22. The method of claim 21 wherein the guiding step comprises rotating the convex guiding surface through the imaging area.

23. The method of claim 21 wherein the illuminating step comprises illuminating an imaging area that is elongated in a direction that is substantially orthogonal to the direction in which portions of the hand are guided.

24. The method of claim 21 further comprising generating a two-dimensional image of surface features of the contacting hand guided through the imaging area.

25. The method of claim 21 wherein placing the hand comprises placing the palm of the hand against the convex contact surface.

26. The method of claim 21 wherein the hand is guided through the imaging area at a rate of about five inches per second or less.

* * * * *